United States Patent

Fukunaga et al.

(10) Patent No.: US 9,633,788 B2
(45) Date of Patent: Apr. 25, 2017

(54) MULTILAYER CERAMIC CAPACITOR

(71) Applicant: Murata Manufacturing Co., Ltd., Nagaokakyo-shi, Kyoto-fu (JP)

(72) Inventors: Daiki Fukunaga, Nagaokakyo (JP); Hideaki Tanaka, Nagaokakyo (JP); Koji Moriyama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 93 days.

(21) Appl. No.: 14/711,975

(22) Filed: May 14, 2015

(65) Prior Publication Data

US 2015/0340155 A1 Nov. 26, 2015

(30) Foreign Application Priority Data

May 21, 2014 (JP) .................... 2014-105588
Apr. 1, 2015 (JP) .................... 2015-075012

(51) Int. Cl.
*H01G 4/012* (2006.01)
*H01G 4/30* (2006.01)
*H01G 4/12* (2006.01)
*H01G 4/248* (2006.01)
*H01G 4/005* (2006.01)

(52) U.S. Cl.
CPC .......... *H01G 4/012* (2013.01); *H01G 4/005* (2013.01); *H01G 4/1218* (2013.01); *H01G 4/1227* (2013.01); *H01G 4/248* (2013.01); *H01G 4/30* (2013.01)

(58) Field of Classification Search
None
See application file for complete search history.

(56) References Cited

U.S. PATENT DOCUMENTS

| 2011/0110014 A1 | 5/2011 | Hirata et al. | |
| 2012/0162858 A1* | 6/2012 | Tanaka | H01G 4/1227 361/321.4 |
| 2014/0301015 A1* | 10/2014 | Kim | H01G 4/30 361/301.4 |

FOREIGN PATENT DOCUMENTS

| JP | 61-248413 A | 11/1986 |
| KR | 10-1143128 B1 | 5/2012 |

OTHER PUBLICATIONS

Fukunaga et al., "Multilayer Ceramic Capacitor", U.S. Appl. No. 15/415,986, filed Jan. 26, 2017.
Fukunaga et al., "Multilayer Ceramic Capacitor", U.S. Appl. No. 15/415,989, filed Jan. 26, 2017.

* cited by examiner

*Primary Examiner* — Dion R Ferguson
(74) *Attorney, Agent, or Firm* — Keating & Bennett, LLP

(57) ABSTRACT

A multilayer ceramic capacitor includes a ceramic body and external electrodes provided on opposite end surfaces of the ceramic body. The ceramic body includes an inner layer portion including a plurality of ceramic layers defining inner layers and a plurality of first and second internal electrodes each disposed at an interface of adjacent ones of the ceramic layers defining the inner layers, outer layer portions sandwiching the inner layer portion in a direction in which the layers are stacked, and side margin portions sandwiching the inner layer portion and the outer layer portions in a width-wise direction. The side margin portion includes pores that decrease in number along a direction from inside to outside of the ceramic body.

10 Claims, 4 Drawing Sheets

MULTILAYER CERAMIC CAPACITOR

BACKGROUND OF THE INVENTION

1. Field of the Invention

The present invention relates to a multilayer ceramic capacitor.

2. Description of the Related Art

In recent years, there is a need for a large-capacity and small-size multilayer ceramic capacitor. Such a multilayer ceramic capacitor, for example, has ceramic layers defining inner layers (dielectric ceramic layers) and internal electrodes stacked alternately with topmost and bottommost surfaces provided with ceramic layers defining outer layers to have a ceramic body having a rectangular parallelepiped shape which is in turn provided at its opposite end surfaces with external electrodes. The ceramic body has opposite side surfaces provided with a side margin portion to prevent connection to the external electrodes.

Such a multilayer ceramic capacitor as described above is produced in a method described in Japanese Patent Laying-Open No. 61-248413. Specifically, the multilayer ceramic capacitor is produced as follows: a plurality of ceramic green sheets each having a surface with a conductive film that will serve as an internal electrode are stacked on one another to form a mother multilayer body, which is in turn cut such that it has a side surface free of an external electrode with the conductive film exposed. Then a ceramic slurry that will serve as a side margin portion is applied on the cut multilayer body at the opposite side surfaces to provide a less varying, uniform side margin portion.

The method for producing a multilayer ceramic capacitor as described in Japanese Patent Laying-Open No. 61-248413, however, provides a side margin portion formed of a ceramic slurry that is including the same dielectric ceramic material as a ceramic slurry that is used to form the ceramic layers defining the inner layers. When a multilayer ceramic capacitor is produced using this method with a baking step performed under a condition applied to form the ceramic layers defining the inner layers, it will have a side margin portion having more pores formed therein, and the pores in the side margin portion allow moisture to be introduced into the multilayer ceramic capacitor, which impairs the reliability of the multilayer ceramic capacitor.

SUMMARY OF THE INVENTION

Preferred embodiments of the present invention provide a multilayer ceramic capacitor allowing a multilayer chip including a side margin portion to be sintered more densely to achieve increased reliability.

In one aspect of various preferred embodiments of the present invention, a multilayer ceramic capacitor includes a ceramic body including a first end surface and a second end surface opposite to the first end surface, a first side surface and a second side surface perpendicular or substantially perpendicular to the first end surface and the second end surface, and a first major surface and a second major surface perpendicular or substantially perpendicular to the first end surface and the first side surface, and including a plurality of dielectric ceramic layers of a perovskite-type compound containing Ba and Ti, and internal electrode layers stacked on one another in a direction extending from the first major surface to the second major surface with a respective one of the plurality of dielectric ceramic layer between each adjacent pair of the internal electrodes; and external electrodes provided on the ceramic body at the first end surface and the second end surface, respectively, the internal electrodes including a first internal electrode and a second internal electrode, each of the first internal electrode and the second internal electrode extending out to a respective one of the first end surface and the second end surface, and electrically connected to a respective one of the external electrodes, when the ceramic body is seen in a direction in which the layers are stacked, the ceramic body includes a region free of the first internal electrode and the second internal electrode defining a side margin portion, and the side margin portion includes a multilayer structure.

Preferably, the side margin portion includes an inner portion adjacent to the internal electrodes and an outer portion located at the side surfaces of the ceramic body, and the inner portion is thinner than the outer portion.

In another aspect of various preferred embodiments of the present invention, a multilayer ceramic capacitor includes a ceramic body including a first end surface and a second end surface opposite to the first end surface, a first side surface and a second side surface perpendicular or substantially perpendicular to the first end surface and the second end surface, and a first major surface and a second major surface perpendicular or substantially perpendicular to the first end surface and the first side surface, and including a plurality of dielectric ceramic layers of a perovskite-type compound containing Ba and Ti, and internal electrodes layers stacked on one another in a direction extending from the first major surface to the second major surface with a respective one of the dielectric ceramic layers between each adjacent pair of the internal electrodes; and external electrodes provided on the ceramic body at the first end surface and the second end surface, respectively, the internal electrode including a first internal electrode and a second internal electrode, each of the first internal electrode and the second internal electrode extending out to a respective one of the first end surface and the second end surface, and electrically connected to a respective one of the external electrodes, when the ceramic body is seen in a direction in which the layers are stacked, the ceramic body includes a region free of the first internal electrode and the second internal electrode defining a side margin portion, and the side margin portion includes pores that decrease in number along a direction from inside to outside of the ceramic body.

In still another aspect of various preferred embodiments of the present invention, a multilayer ceramic capacitor includes a ceramic body including a first end surface and a second end surface opposite to the first end surface, a first side surface and a second side surface perpendicular or substantially perpendicular to the first end surface and the second end surface, and a first major surface and a second major surface perpendicular or substantially perpendicular to the first end surface and the first side surface, and including a plurality of dielectric ceramic layers of a perovskite-type compound containing Ba and Ti, and internal electrodes stacked in a direction extending from the first major surface to the second major surface with a respective one of the dielectric ceramic layers between each adjacent pair of the internal electrodes; and external electrodes provided on the ceramic body at the first end surface and the second end surface, respectively, the internal electrodes including a first internal electrode and a second internal electrode, each of the first internal electrode and the second internal electrode extending out to a respective one of the first end surface and the second end surface, and electrically connected to a respective one of the external electrodes, when the ceramic body is seen in a direction in which the layers are stacked, the ceramic body includes a region free of the first internal electrode and the second internal electrode defining a side margin portion, the side margin portion includes ceramic grains of the ceramic dielectric with Ba between the ceramic grains and the ceramic grains decrease in number along a direction from inside to outside of the ceramic body.

Preferably, each of the dielectric ceramic layers contains ceramic grains with Ba present between the ceramic grains, and the side margin portion contains Ba at a portion thereof adjacent to the first and second internal electrodes in an amount larger than an amount at a portion located at the side surfaces by larger than about 100% and smaller than about 140%, for example.

Furthermore, preferably, each of the dielectric ceramic layers contains ceramic grains with Ba present therebetween, and the side margin portion at a portion thereof adjacent to the first and second internal electrodes contains Ba in an amount having a molar ratio larger than about 1.020 and smaller than about 1.040 relative to 1 mol of Ti, and the side margin portion at a portion thereof located at the side surfaces contains Ba in an amount having a molar ratio larger than about 1.000 and smaller than about 1.020 relative to 1 mol of Ti, for example.

Furthermore, preferably, the dielectric ceramic layer sandwiched between the first internal electrode and the second internal electrode contains Ba in an amount smaller than the side margin portion.

Furthermore, preferably, the side margin portion includes an inner portion adjacent to the internal electrodes and an outer portion located at the side surfaces of the ceramic body, and the inner portion contains Ba in an amount larger than the outer portion.

When the ceramic body is seen in a direction in which the layers are stacked, the region of the ceramic body that is free of the first internal electrode and the second internal electrode defining a side margin portion that has a multilayer structure significantly reduces or minimizes moisture that would otherwise be introduced into the ceramic body and thus allows the multilayer ceramic capacitor to be enhanced in moisture resistance. Thus, a multilayer ceramic capacitor with enhanced reliability is provided.

Furthermore, the side margin portion including an inner portion adjacent to the internal electrodes and an outer portion located at the side surfaces of the ceramic body also significantly reduces or minimizes moisture that would otherwise be introduced into the ceramic body. Thus, a multilayer ceramic capacitor with enhanced moisture resistance is provided.

When the ceramic body is seen in a direction in which the layers are stacked and includes a region that is free of the first internal electrode and the second internal electrode defining a side margin portion, and when a multilayer chip having the side margin portion is sintered under a condition applied to sinter the inner layer portion of the ceramic body including the internal electrodes, the side margin portion can nonetheless have pores that decrease in number along a direction from inside to outside of the ceramic body and thus significantly reduce or minimize moisture that would otherwise be introduced into the ceramic body and thus allows the multilayer ceramic capacitor to achieve enhanced moisture resistance so as to provide a multilayer ceramic capacitor with enhanced reliability.

According to a preferred embodiment of the present invention, the ceramic body includes the side margin portion including ceramic grains of the ceramic dielectric with Ba between the ceramic grains and the ceramic grains decrease in number along a direction from inside to outside of the ceramic body. As such, when a multilayer chip including the side margin portion is sintered under a condition applied to sinter the inner layer portion of the ceramic body including the internal electrodes, the side margin portion nonetheless includes an outer region promoting growth of dielectric ceramic grains therein and thus the outer region is sintered more densely, and thus an outer portion includes portions of the dielectric ceramic layers with fewer pores, and the side margin portion thus prevents moisture penetration into the ceramic body. On the other hand, the side margin portion includes an inner portion with Ba in a larger amount and thus significantly reduces or minimizes growth of the dielectric ceramic grains therein and accordingly enhances reliability between the internal electrodes. A multilayer ceramic capacitor with enhanced reliability is thus provided.

Furthermore, to improve the reliability of the multilayer ceramic capacitor including the side margin portion, preferably, the dielectric ceramic layers include ceramic grains with Ba present therebetween, and the side margin portion contains Ba at a portion thereof adjacent to the first and second internal electrodes in an amount larger than an amount at a portion thereof located at the side surfaces by larger than about 100% and smaller than about 140%, and furthermore, preferably, the side margin portion at a portion thereof adjacent to the first and second internal electrodes contains Ba in an amount having a molar ratio larger than about 1.020 and smaller than about 1.040 relative to 1 mol of Ti, and the side margin portion at a portion thereof located at the side surfaces contains Ba in an amount having a molar ratio larger than about 1.000 and smaller than about 1.020 relative to 1 mol of Ti, for example.

Furthermore, to improve the reliability of the multilayer ceramic capacitor including the side margin portion, preferably, the side margin portion includes an inner portion adjacent to the internal electrode and an outer portion located at the side surfaces, and the inner portion contains Ba in an amount larger than the outer portion.

Preferred embodiments of the present invention provide a multilayer ceramic capacitor including a side margin portion that is able to be sintered more densely to achieve increased reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
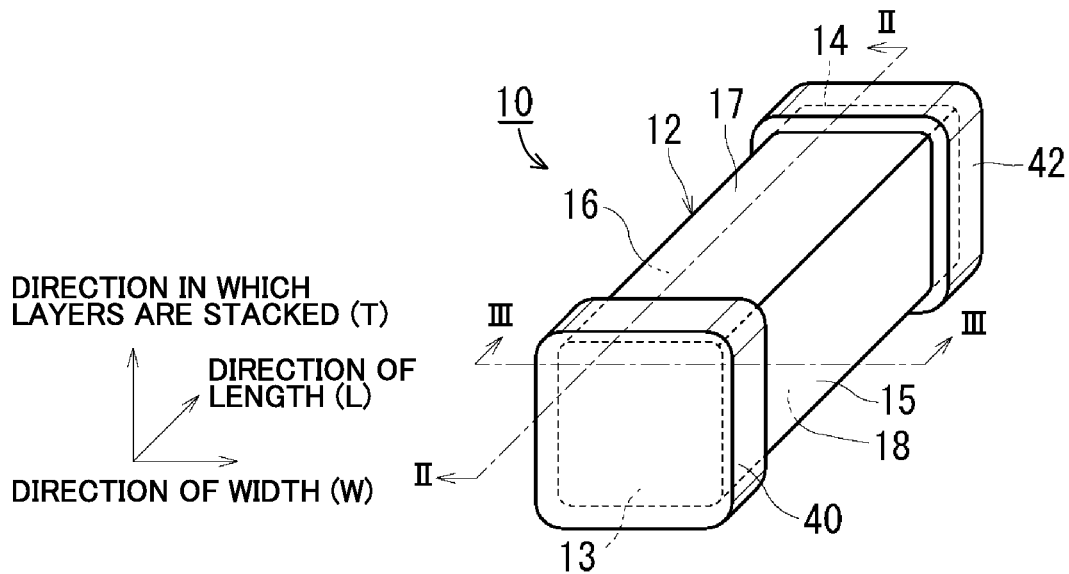
FIG. 1 is a schematic perspective view of one example of a multilayer ceramic capacitor according to a preferred embodiment of the present invention.
Figure 2:
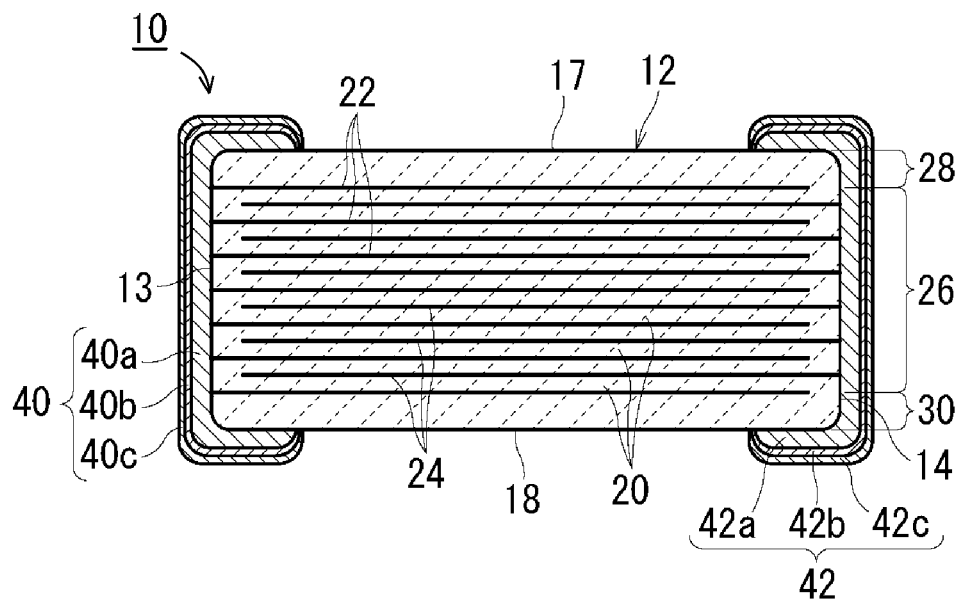
FIG. 2 is a cross section taken along a line II-II line shown in FIG. 1.
Figure 3:
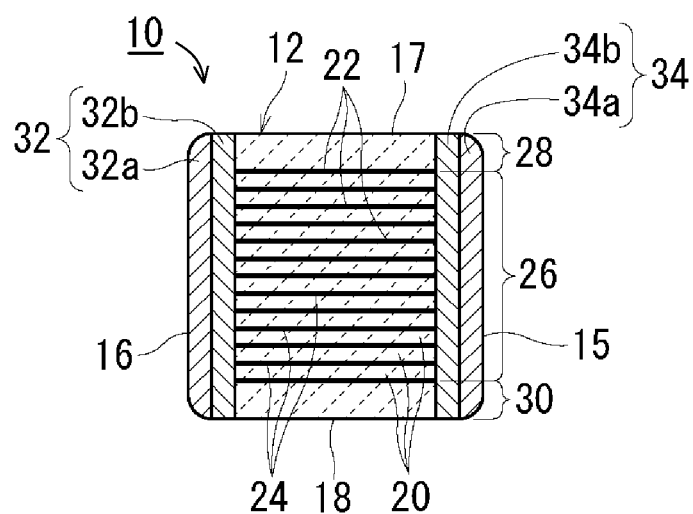
FIG. 3 is a cross section taken along a line III-III line shown in FIG. 1.

Examples of multilayer ceramic capacitors according to preferred embodiments of the present invention will now be described. FIG. 1 is a schematic perspective view of a multilayer ceramic capacitor that is one non-limiting example of a multilayer ceramic capacitor including a ceramic body and an external electrode. FIG. 2 is a cross section taken along a line II-II line shown in FIG. 1. Furthermore, FIG. 3 is a cross section taken along a line III-III line shown in FIG. 1.

The present preferred embodiment provides a multilayer ceramic capacitor 10 including a ceramic body 12 and external electrodes 40 and 42 provided on opposite end surfaces of the ceramic body 12.

The multilayer ceramic capacitor 10 preferably has a dimension in a direction of a length (L) thereof, a dimension in a direction of a width (W) thereof, and a dimension in a direction in which ceramic body 12 includes layers stacked (T) to, for example, be approximately 1.6 mm×0.8 mm×0.8 mm, 1.0 mm×0.5 mm×0.5 mm, 0.6 mm×0.3 mm×0.3 mm, or 0.4 mm×0.2 mm×0.2 mm.

The ceramic body 12 preferably has a rectangular or substantially rectangular parallelepiped shape, and includes a first end surface 13 and a second end surface 14 extending in the direction of width (W) and the direction in which the layers are stacked (T), a first side surface 15 and a second side surface 16 extending in the direction of length (L) and the direction in which the layers are stacked (T), and a first major surface 17 and a second major surface 18 extending in the direction of length (L) and the direction of width (W). Furthermore, the ceramic body 12 includes a first end surface 13 and a second end surface 14 opposite to each other, a first side surface 15 and a second side surface 16 opposite to each other, and a first major surface 17 and a second major surface 18 opposite to each other. Furthermore, the first side surface 15 and the second side surface 16 are perpendicular or substantially perpendicular to the first end surface 13 and the second end surface 14, and the first major surface 17 and the second major surface 18 are perpendicular or substantially perpendicular to the first end surface 13 and the second side surface 16. Furthermore, ceramic body 12 preferably has its corners and ridges rounded.

The ceramic body 12 includes an inner layer portion 26 including a plurality of ceramic layers (dielectric ceramic layers) 20 defining inner layers and a plurality of first and second internal electrodes 22 and 24 each disposed at an interface of adjacent ones of the ceramic layers 20; outer layer portions 28 and 30 provided with ceramic layers defining outer layers, respectively, sandwiching an inner layer portion 26 in the direction in which the layers are stacked (T); and side margin portions 32 and 34 provided with ceramic layers defining side margins, respectively, sandwiching the inner layer portion 26 and the outer layer portions 28 and 30 in the direction of width (W). In other words, the inner layer portion 26 is a region sandwiched by the first and second internal electrodes 22 or 24 closest to the first major surface 17 and the second major surface 18, respectively. Furthermore, the side margin portions 32 and 34 are regions free of the first internal electrode 22 and the second internal electrode 24 when the ceramic body 12 is seen in the direction in which the layers are stacked (T).

The ceramic layers 20 defining the inner layers include, for example, dielectric ceramic grains containing a Ba and Ti-containing perovskite-type compound as a major component and having a perovskite structure. Furthermore, an additive of at least one of Si, Mg and Ba is added to the major component of the ceramic layers 20 and present between the ceramic grains. Preferably, each of the ceramic layers 20 after baking has a thickness of about 0.3 μm or larger and about 10 μm or smaller, for example.

Top and bottom outer layer portions 28, 30 are preferably formed using the same dielectric ceramic material as ceramic layers 20 defining the inner layers. Note that the outer layer portions 28 and 30 may include a dielectric ceramic material different from ceramic layers 20 defining the inner layers. Preferably, the outer layer portions 28 and 30 after they are baked each have a thickness of 15 μm or larger and about 40 μm or smaller, for example.

The first internal electrode 22 and the second internal electrode 24 are opposite to each other with one of the ceramic layers therebetween in a direction of thickness. Electrostatic capacitance is generated at a portion at which the first internal electrode 22 and the second internal electrode 24 are opposite to each other with one of the ceramic layers 20 therebetween.

The first internal electrode 22, as seen in FIG. 2, includes a left end is exposed at the first end surface 13 of the ceramic body 12 and is electrically connected to the external electrode 40. The second internal electrode 24, as seen in FIG. 2, includes a right end exposed at the second end surface 14 of the ceramic body 12 and electrically connected to the external electrode 42.

The first and second internal electrodes 22 and 24 are preferably formed of, for example, Ni, Cu, or the like. Preferably, the first and second internal electrodes 22 and 24 each have a thickness of about 0.3 μm or larger and about 2.0 μm or smaller, for example.

The side margin portions 32 and 34 preferably have a 2-layer structure, for example, including outer portions 32a and 34a, respectively, each located at a side surface of the ceramic body 12, and inner portions 32b and 34b, respectively, adjacent to the first and second internal electrodes 22 and 24. Furthermore, the side margin portions 32 and 34 are preferably composed of, for example, a dielectric ceramic material having a perovskite structure containing $BaTiO_3$ or the like as a major component. Furthermore, an additive of at least one of Si, Mg and Ba is added to the major component and present between the ceramic grains. Preferably, the side margin portions 32 and 34 after they are baked each have a thickness of about 5 μm or larger and about 40 μm or smaller, for example. In particular, a thickness of about 20 μm or smaller allows preferred embodiments of the present invention to operate effectively. Furthermore, preferably, the inner portions 32b and 34b are smaller in thickness than the outer portions 32a and 34a, and specifically, it is preferable that the outer portions 32a, 34a have a thickness of about 5 μm or larger and about 20 μm or smaller and that the inner portions 32b, 34b have a thickness of about 0.1 μm or larger and about 20 μm or smaller, for example. Note that as the outer portions 32a and 34a and the inner portions 32b and 34b are different in sinterability, it can be easily understood via an optical microscope that the side margin portions 32 and 34 preferably have a 2-layer structure, for example. Furthermore, the side margin portions 32 and 34 are each not limited to the two layers including the outer portions 32a, 34a and the inner portions 32b, 34b, and may each include three or more layers, for example.

Note that thicknesses of the outer layer portions 28, 30 or the side margin portions 32, 34 preferably are calculated as follows: the ceramic body 12 is ground to be approximately halved in length in a direction perpendicular or substantially perpendicular to a plane extending in the direction in which the layers are stacked (T) and the direction of width (W) and a length thereof extending outward from an end of an internal electrode (including an end in which the ceramic dielectric material has been diffused) is measured every 10 layers, and such lengths are averaged out to obtain the thickness.

Furthermore, the side margin portion 32 contains fewer pores in the outer portion 32a than in the inner portion 32b and the side margin portion 34 contains fewer pores in the outer portion 34a than in the inner portion 34b.

Note that a "pore" as used herein is intermingled with a space or a portion having glass therein. The number of pores that are present can be obtained by counting them in an image of a range of approximately 30 μm×30 μm magnified by 5,000 times and obtained via a SEM, for example.

Furthermore, the side margin portions 32, 34 contain ceramic grains that are smaller in grain size and hence denser in the inner portions 32b, 34b than in the outer portions 32a, 34a. In particular, the side margin portions 32, 34 contain ceramic grains that are smaller in grain size and hence denser in the inner portions 32b, 34b at ends of the first and second internal electrodes 22 and 24 that are close to the side margin portions 32, 34 than in the outer portions 32a, 34a.

The pores can be observed, similarly as done when the side margin portions 32, 34 are measured in thickness: the ceramic body 12 is ground, and when the multilayer ceramic capacitor 10 preferably has a geometrical dimension of, for example, approximately 0.6 mm×0.3 mm×0.3 mm, the ceramic body 12 is magnified by 5,000 times and thus imaged via a SEM and observed as the number of pores is counted.

Furthermore, magnifying the ceramic body 12 by 20,000-50,000 times and imaging it via a SEM, and selecting the grains in the imaged range and calculating their average size (e.g., for 50 grains) allow one to understand how the outer portions 32a and 34a and the inner portions 32b and 34b are different in grain size.

Furthermore, the inner layer portion 26 of the ceramic layer 20 defining one of the internal layers, the side margin portions 32, 34, and the outer portions 32a and 34a and the inner portions 32b and 34b contain ceramic grains including an additive of Ba therebetween in such amounts, respectively, that the ceramic layer 20 <the outer portions 32a, 34a<the inner portions 32b, 34b. Thus, the side margin portions 32, 34 contain ceramic grains including the additive Ba therebetween in different contents. Determining the different Ba contents can be done through a TEM analysis.

The side margin portions 32 and 34, the outer portions 32a and 34a and inner portions 32b and 34b have their respective Ba contents prepared such that outer portions 32a and 34a contain Ba to have a molar ratio relative to 1 mol of Ti with a center value larger than about 1.000 and smaller than about 1.020 and inner portions 32b and 34b do so with a center value larger than about 1.020 and smaller than about 1.040.

Furthermore, grinding ceramic body 12 at side margin portions 32 and 34 to obtain powder of outer portions 32a and 34a and that of inner portions 32b and 34b and dissolving the obtained powders by acid and subjecting them to an ICP emission spectrochemical analysis, allow one to confirm that outer portions 32a and 34a and inner portions 32b and 34b have the above molar ratios.

Furthermore, with these ranges applied, inner portions 32b and 34b contain Ba between ceramic grains in an amount larger than outer portions 32a and 34a by larger than about 100% and smaller than about 140%, for example.

External electrodes 40, 42 preferably have a 3-layer structure including: electrode layers 40a and 42a provided by baking, and containing Cu; first plating layers 40b and 42b provided on surfaces of electrode layers 40a and 42a and containing Ni to prevent dissolution of solder; and second plating layers 40c and 42c provided on surfaces of first plating layers 40b and 42b and containing Sn.

The multilayer ceramic capacitor 10 shown in FIG. 1 includes side margin portions 32, 34 including pores that decrease in number as seen in a direction extending from inside to outside of the capacitor body. In other words, the multilayer ceramic capacitor 10 shown in FIG. 1 that includes the side margin portions 32 and 34 with the outer portions 32a and 34a having fewer pores than the inner portions 32b and 34b, significantly reduces or minimizes moisture otherwise introduced from the side margin portions 32, 34 through pores into the ceramic body 12 and thus be improved in moisture resistance.

Furthermore, the multilayer ceramic capacitor 10 shown in FIG. 1 includes the side margin portions 32, 34 including ceramic grains with Ba therebetween decreasingly as seen from inner portions 32b and 34b toward outer portions 32a and 34a, respectively, (or from inside to outside). Furthermore, Ba is diffused from the inner portions 32b and 34b to the ceramic layers 20 for the internal layers between the inner portions 32b and 34b and the ends of the first and second internal electrodes 22 and 24, and Ba is thus provided in an increased amount at the first and second internal electrodes 22 and 24 in a vicinity of the side margin portions 32 and 34. This significantly reduces or minimizes growth of ceramic grains at the ends of the first and second internal electrodes 22 and 24 and thus enhances reliability between the internal electrodes.

On the other hand, the multilayer ceramic capacitor 10 shown in FIG. 1 includes the side margin portions 32 and 34 with the outer portions 32a and 34a having less Ba and thus facilitating growth of the ceramic grains to allow the ceramic grains to be sintered more densely. The multilayer ceramic capacitor is thus resistant to external moisture penetration.

Figure 4A:
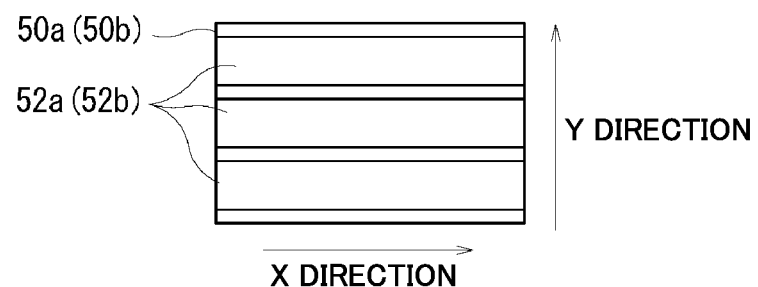
FIG. 4A and FIG. 4B are diagrams for illustrating a method for producing the multilayer ceramic capacitor, FIG. 4A being a schematic perspective view of a ceramic green sheet provided with a conductive film, FIG. 4B being a schematic perspective view of the ceramic green sheet provided with the conductive film disposed on another ceramic green sheet provided with a conductive film.
Figure 4B:
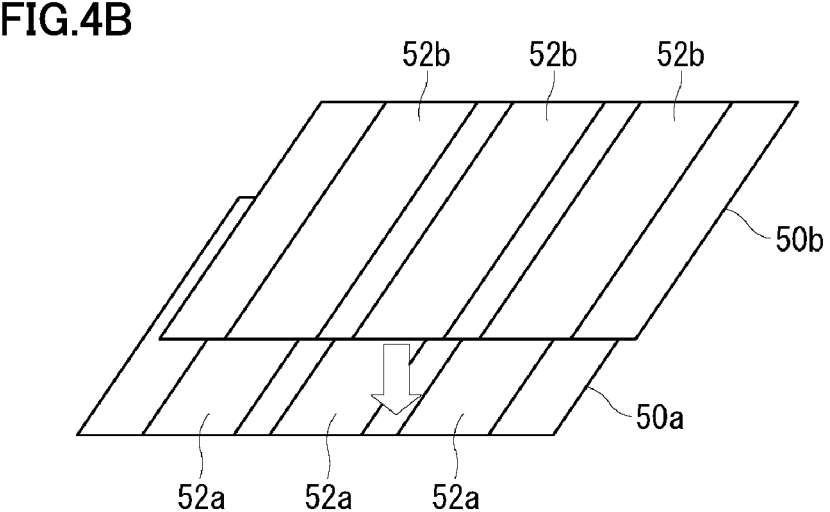
Figure 5:
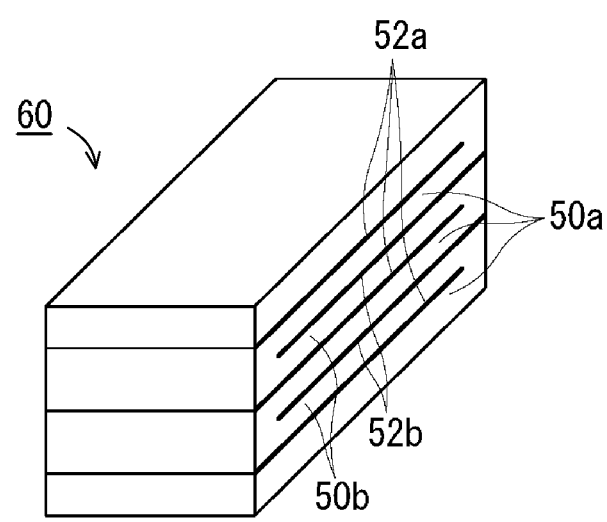
FIG. 5 is a schematic perspective view of one example of a multilayer chip produced in the method for producing a multilayer ceramic capacitor as shown in FIG. 4A and FIG. 4B.

The multilayer ceramic capacitor may be produced using a non-limiting example of a method, as will be described hereinafter. FIG. 4A and FIG. 4B are diagrams for illustrating a method for producing the multilayer ceramic capacitor, FIG. 4A being a schematic perspective view of a ceramic green sheet provided with a conductive film, FIG. 4B being a schematic perspective view of the ceramic green sheet having the conductive film disposed on another ceramic green sheet provided with a conductive film. FIG. 5 is a schematic perspective view of one example of a multilayer chip produced according to the method for producing a multilayer ceramic capacitor as shown in FIG. 4A and FIG. 4B. The non-limiting example of a method will now be described hereafter more specifically.

Initially, a perovskite-type compound containing Ba and Ti is prepared as a dielectric ceramic material. From the dielectric ceramic material, a powdery dielectric material is obtained, and therewith an additive that is at least one of Si, Mg and Ba, an organic binder, an organic solvent, a plasticizer, and a dispersant are mixed at a prescribed ratio to prepare a ceramic slurry. The ceramic slurry is applied on a resin film (not shown) to form a plurality of ceramic green sheets 50a (50b). The ceramic green sheets 50a (50b) are preferably formed with a die coater, a gravure coater, a micro gravure coater or the like.

Then, as shown in FIG. 4A, on a surface of the ceramic green sheet 50a (50b), a conductive paste for forming the internal electrodes is printed in stripes in a direction X and dried to form a conductive film 52a (52b) that will define and serve as the internal electrode 22 (24). The paste preferably may be printed using various methods, such as screen printing, ink jet printing, gravure printing or the like. The conductive film 52a (52b) preferably has a thickness of about 1.5 µm or smaller, for example.

Subsequently, as shown in FIG. 4B, a plurality of the ceramic green sheets 50a and 50b having the conductive films 52a and 52b printed thereon are disposed on one another so as to be offset in a direction Y perpendicular or substantially perpendicular to a direction X, direction X being a direction in which conductive films 52a and 52b are printed, direction Y being the widthwise direction of conductive films 52a and 52b. Furthermore, the ceramic green sheets 50a and 50b thus stacked on one another to define and serve as inner layer portion 26 are provided on their topmost and bottommost surfaces with a prescribed number of the ceramic green sheets that do not have any conductive film thereon and will define and serve as the outer layer portions 28, 30, deposited thereon on one another to thus provide a mother multilayer body.

Then, the obtained mother multilayer body is pressed. The mother multilayer body is mechanically, hydrostatically, or similarly pressed.

Subsequently, the pressed mother multilayer body is cut into chips, and a multilayer chip 60 as shown in FIG. 5 is obtained. The mother multilayer body may preferably be cut in a variety of methods such as pressing and cutting, dicing, cutting with laser, or the like.

The above process provides the multilayer chip 60 including opposite end surfaces with one end surface including only the ceramic green sheet 50a with the conductive film 52a exposed and the other end surface including only the ceramic green sheet 50b with the conductive film 52b exposed.

Furthermore, the multilayer chip 60 includes opposite side surfaces with the ceramic green sheet 50a with the conductive film 52a and the ceramic green sheet 50b with the conductive film 52b exposed.

A ceramic green sheet that will define and serve as the side margin portions 32 and 34 is then prepared, as will be described hereafter more specifically.

Initially, a perovskite-type compound containing Ba and Ti is prepared as a dielectric ceramic material. From the dielectric ceramic material, a powdery dielectric material is obtained, and therewith an additive that is at least one of Si, Mg and Ba, a resin binder, an organic solvent, a plasticizer, and a dispersant are mixed at a prescribed ratio to prepare ceramic slurry.

It should be noted that the side margin portions 32 and 34 and the outer portions 32a and 34a are preferably made of a ceramic slurry adjusted to contain Ba having a molar ratio larger than about 1.000 and smaller than about 1.020 relative to 1 mol of Ti, for example. Furthermore, the side margin portions 32 and 34 and the inner portions 32b and 34b are preferably made of a ceramic slurry adjusted to contain Ba having a molar ratio larger than about 1.020 and smaller than about 1.040 relative to 1 mol of Ti, for example.

The ceramic slurry that will define and serve as the side margin portions 32 and 34 and the outer portions 32a and 34a preferably contains polyvinyl chloride (PVC) in an amount larger than the ceramic slurry that will define and serve as the side margin portions 32 and 34 and the inner portions 32b and 34b.

Furthermore, the ceramic slurry that will define and serve as the side margin portions 32 and 34 and the inner portions 32b and 34b preferably contains an optimal solvent selected as appropriate to prevent damage to the ceramic green sheets for the outer portions. Furthermore, the ceramic green sheets for the inner portions bond with multilayer chip 60.

Then the prepared ceramic slurry that will define and serve as the side margin portions 32 and 34 and the outer portions 32a and 34a is applied on a resin film and dried to form the ceramic green sheets for the outer portions.

Then the prepared ceramic slurry that will define and serve as the side margin portions 32 and 34 and the inner portions 32b and 34b is applied on the surfaces of the ceramic green sheets for the outer portions and dried to form the ceramic green sheets for the inner portions, and as a result, ceramic green sheets of a 2-layer structure for side margin are formed.

Note that the ceramic green sheet for the inner portion preferably is formed to be smaller in thickness than the ceramic green sheet for the outer portion. For example, the ceramic green sheet for the outer portion preferably has a thickness of about 5 µm or larger and about 20 µm or smaller after it is baked, and the ceramic green sheet for the inner portion preferably has a thickness of about 0.1 µm or larger and about 20 µm or smaller after it is baked. Preferably, the ceramic green sheet for the outer portion is thicker than the ceramic green sheet for the inner portion. Furthermore, the outer portions 32a and 34a and the inner portions 32b and 34b have an interface therebetween and this interface alleviates stress applied to the multilayer ceramic capacitor 10.

While the ceramic green sheet preferably including the 2-layer structure for the side margin is produced by printing the ceramic green sheet for the inner portion on a surface of the ceramic green sheet for the outer portion. Alternatively, the ceramic green sheet for the outer portion and the ceramic green sheet for the inner portion may previously be formed and subsequently bonded together to produce the ceramic green sheet preferably including the 2-layer structure for the side margin.

Then, the ceramic green sheet for the side margin is peeled off the resin film.

Subsequently, the multilayer chip 60 has both side surfaces including conductive films 52a, 52b, exposed, pressed against the peeled ceramic green sheet at the ceramic green sheet for the inner portion to stamp the ceramic green sheet to form layers that will define and serve as the side margin portions 32 and 34. Note that in doing so, it is preferable that the multilayer chip 60 include a side surface with an organic solvent that defines and serves as an adhesive previously applied thereto.

The multilayer chip 60 provided with the layers that will define and serve as the side margin portions 32 and 34 is degreased in an atmosphere of nitrogen under a prescribed condition, and thereafter baked in an atmosphere of a mixture of nitrogen, hydrogen and vapor at a prescribed temperature to be a sintered ceramic body 12.

Then, a paste containing Cu as a major component for an external electrode is applied to the opposite ends of the sintered ceramic body 12 and baked to form the electrode layers 40a and 42a electrically connected to the first and second internal electrodes 22 and 24. Furthermore, the electrode layers 40a and 42a include surfaces, respectively, plated with Ni to provide first plating layers 40b and 42b, and the first plating layers 40b and 42b include surfaces, respectively, plated with Sn to provide second plating layers 40c and 42c to thus define the external electrodes 40 and 42.

The multilayer ceramic capacitor 10 shown in FIG. 1 is thus produced.

Note that the side margin portions 32 and 34 may alternatively be provided by applying the ceramic slurry for the side margin to the opposite side surfaces of the multilayer chip 60 with the conductive films 52a and 52b exposed.

More specifically, the ceramic slurry that will define and serve as the inner portions 32b and 34b is applied to the opposite side surfaces of the multilayer chip 60 with the conductive films 52a and 52b exposed and is then dried, and furthermore, the ceramic slurry that will define and serve as the outer portions 32a and 34a is applied thereon.

In that case, the ceramic slurry that will define and serve as the inner portions 32b and 34b and the ceramic slurry that will define and serve as the outer portions 32a and 34a can be adjusted in thickness by adjusting the amount of resin contained in each ceramic slurry.

Furthermore, the side margin portions 32, 34 may be formed as follows: the multilayer chip 60 has the opposite end surfaces masked with resin or the like and is then entirely dipped into the ceramic slurry that will define and serve as the inner portions 32b and 34b, and the multilayer chip 60 is then dried and furthermore, dipped into the ceramic slurry that will define and serve as the outer portions 32a and 34a. This also covers the outer layer portions 28 and 30 by the side margin portions 32 and 34 in a 2-layer structure.

Exemplary Experiment

In an exemplary experiment, samples of multilayer ceramic capacitors for inventive and comparative examples, as described hereinafter, were produced and underwent a moisture-proof test for assessment.

Invention Example

In the inventive example, the above described method was used to produce a sample of the multilayer ceramic capacitor 10 shown in FIG. 1. The sample of the multilayer ceramic capacitor 10 geometrically had dimensions of about 0.6 mm in length, about 0.3 mm in width, and about 0.3 mm in height. In the inventive example, the side margin portions 32 and 34 included the outer portions 32a and 34a and the inner portions 32b and 34b formed with an additive of Ba having molar ratios of about 1.020 and about 1.028, respectively, relative to 1 mol of Ti. Furthermore, the side margin portions 32 and 34 each had a thickness of about 20 μm, and the outer portions 32a and 34a each had a thickness of about 16 μm and inner portions 32b and 34b each had a thickness of about 4 μm. Furthermore, the ceramic layers 20 defining the inner layers had a thickness of about 0.83 μm per layer, the first and second internal electrodes 22 and 24 had a thickness of about 0.40 μm per layer, and the outer layer portion 28 and the outer layer portion 30 each had a thickness of about 25 μm. Note that the numerical values in thickness are all numerical values obtained after the layers are baked. Furthermore, 280 of the ceramic layers 20 were stacked to define the inner layers.

Comparative Example

For the comparative example, a multilayer ceramic capacitor was produced under the same conditions as the inventive example except that the side margin portion was formed with an additive of Ba having a uniform molar ratio of 1.020 relative to 1 mol of Ti.

Moisture-Proof Test

The inventive and comparative examples had their samples subjected to a moisture-proof test. The moisture-proof test was conducted at a relative humidity of about 95% and a temperature of about 40 degrees centigrade with a rated voltage of about 6.3 V applied, for example. Then, each sample's insulation resistance value was measured and any sample presenting degradation in insulation resistance within $1.0 \times 10^6$ [Ω] was assessed as defective. The inventive and comparative examples each had 36 samples subjected to the moisture-proof test.

The moisture-proof test indicated that the comparative example had its 36 sample multilayer ceramic capacitors all assessed as defective.

In contrast, the inventive example did not have any of its 36 sample multilayer ceramic capacitors assessed as defective.

The inventive example thus provided a highly reliable multilayer ceramic capacitor in all of its samples.

Note that the present invention is not limited to the above preferred embodiments; rather, it is modified variously within the scope of its gist. Furthermore, ceramic electronic components include ceramic layers that are not limited in thickness, number of layers, area of opposing electrodes, and geometrical dimensions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a ceramic body including a first end surface and a second end surface opposite to the first end surface, a first side surface and a second side surface perpendicular or substantially perpendicular to the first end surface and the second end surface, and a first major surface and a second major surface perpendicular or substantially perpendicular to the first end surface and the first side surface, and including a plurality of dielectric ceramic layers of a perovskite-type compound containing Ba and Ti, and internal electrode layers stacked on one another in a direction extending from the first major surface to the second major surface with a respective one of the plurality of dielectric ceramic layer between each adjacent pair of the internal electrodes; and
   external electrodes provided on the ceramic body at the first end surface and the second end surface, respectively; wherein
   the internal electrodes includes a first internal electrode and a second internal electrode;
   each of the first internal electrode and the second internal electrode extends out to a respective one of the first end surface and the second end surface, and is electrically connected to a respective one of the external electrodes;
   when the ceramic body is seen in a direction in which the layers are stacked, the ceramic body includes a region free of the first internal electrode and the second internal electrode defining a side margin portion; and
   the side margin portion includes ceramic grains of the ceramic dielectric with Ba between the ceramic grains; and
   an amount of the Ba decreases along a direction extending from inside to outside of the ceramic body.

2. The multilayer ceramic capacitor according to claim 1, wherein the side margin portion has one of a two layer structure and a structure include three or more layers.

3. The multilayer ceramic capacitor according to claim 1, wherein the side margin portion includes an inner portion adjacent to the internal electrode and an outer portion located at the side surfaces of the ceramic body, and the inner portion is smaller in thickness than the outer portion.

4. The multilayer ceramic capacitor according to claim 1, wherein the ceramic body has a rectangular or substantially rectangular parallelepiped shape.

5. The multilayer ceramic capacitor according to claim 1, wherein each of the ceramic layers includes dielectric ceramic grains containing a Ba and Ti-containing perovskite-type compound as a major component and having a perovskite structure and one of Si, MG and Ba present between the grains.

6. The multilayer ceramic capacitor according to claim 1, wherein the side margin portion is made of a dielectric ceramic material including ceramic grains and with a perovskite structure and one of Si, MG and Ba present between the grains.

7. The multilayer ceramic capacitor according to claim 1, wherein:
   each of the dielectric ceramic layers includes ceramic grains with Ba present between the ceramic grains; and
   the side margin portion contains Ba at a portion thereof adjacent to the first and second internal electrodes in an amount larger than an amount at a portion thereof located at the side surfaces by larger than about 100% and smaller than about 140%.

8. The multilayer ceramic capacitor according to claim 1, wherein:
   each of the dielectric ceramic layers includes ceramic grains with Ba present between the ceramic grains; and
   the side margin portion at a portion thereof adjacent to the first and second internal electrodes contains Ba in an amount having a molar ratio larger than about 1.020 and smaller than about 1.040 relative to 1 mol of Ti, and the side margin portion at a portion thereof located at the side surfaces contains Ba in an amount having a molar ratio larger than about 1.000 and smaller than about 1.020 relative to 1 mol of Ti.

9. The multilayer ceramic capacitor according to claim 1, wherein one of the dielectric ceramic layers sandwiched between the first internal electrode and the second internal electrode contains Ba in an amount smaller than the side margin portion.

10. The multilayer ceramic capacitor according to claim 1, wherein
   the side margin portion includes an inner portion adjacent to the internal electrode and an outer portion located at the side surfaces of the ceramic body; and
   the inner portion contains Ba in an amount larger than the outer portion.

* * * * *